United States Patent
Kim et al.

(10) Patent No.: US 10,206,512 B2
(45) Date of Patent: Feb. 19, 2019

(54) HONEYCOMB-STRUCTURED SITTING CUSHION

(71) Applicants: BULLSONE CO., LTD., Seoul (KR); CAREMATE CORPORATION, Ansan-si (KR)

(72) Inventors: Young-Jin Kim, Incheon (KR); Byoung-Jun Seo, Incheon (KR); He-Goun Yoon, Seoul (KR)

(73) Assignees: BULLSONE CO., LTD., Seoul (KR); CAREMATE CORPORATION, Asan-si (KR)

( * ) Notice: Subject to any disclaimer, the term of this patent is extended or adjusted under 35 U.S.C. 154(b) by 0 days.

(21) Appl. No.: 15/533,323

(22) PCT Filed: Jul. 28, 2015

(86) PCT No.: PCT/KR2015/007875
§ 371 (c)(1),
(2) Date: Jun. 5, 2017

(87) PCT Pub. No.: WO2016/088977
PCT Pub. Date: Jun. 9, 2016

(65) Prior Publication Data
US 2017/0347801 A1 Dec. 7, 2017

(30) Foreign Application Priority Data
Dec. 5, 2014 (KR) .......................... 10-2014-0174283

(51) Int. Cl.
*A47C 7/34* (2006.01)
*A47B 3/10* (2006.01)
(Continued)

(52) U.S. Cl.
CPC .................. *A47C 7/34* (2013.01); *A47B 3/10* (2013.01); *B32B 3/04* (2013.01); *B32B 3/085* (2013.01);
(Continued)

(58) Field of Classification Search
CPC .. A47C 7/34; A47C 7/021; A47C 7/16; A47C 7/18; A47C 7/20; A47C 27/14
See application file for complete search history.

(56) References Cited

U.S. PATENT DOCUMENTS

| 544,881 | A |   | 8/1895 | Chamberlain |
| 5,749,111 | A | * | 5/1998 | Pearce ................... A43B 13/04 |
|   |   |   |   | 428/137 |

(Continued)

FOREIGN PATENT DOCUMENTS

| JP | 2001-514912 A | 9/2001 |
| JP | 2002-234039 A | 8/2002 |

(Continued)

OTHER PUBLICATIONS

International Search Report dated Oct. 21, 2015 in counterpart International Patent Application No. PCT/KR2015/007875 (2 pages, in English)

(Continued)

*Primary Examiner* — Philip F Gabler
(74) *Attorney, Agent, or Firm* — NSIP Law

(57) ABSTRACT

The present invention relates to a honeycomb-structured sitting cushion comprising: a lower seat in which first through holes, which are vertical holes having a regular hexagonal cross-section, are formed and the first through holes, spaced at predetermined intervals from each other by first partitions, are consecutively formed in x-axial and y-axial directions; and an upper seat which is formed on the lower seat, and in which second through holes, which are (Continued)

vertical holes having a regular hexagonal cross-section larger than that of the first through holes, are formed, and the second through holes, spaced at predetermined intervals from each other by second partitions having a thickness (T2) smaller than the thickness (T1) of the first partitions, are consecutively formed in x-axial and y-axial directions, wherein the centers of the first through holes and the first partitions are aligned with the centers of the second through holes and the second partitions.

4 Claims, 4 Drawing Sheets

(51) Int. Cl.
    *B32B 5/14*     (2006.01)
    *B32B 7/02*     (2006.01)
    *B32B 25/04*     (2006.01)
    *B32B 25/08*     (2006.01)
    *B32B 27/08*     (2006.01)
    *B32B 3/04*     (2006.01)
    *B32B 3/08*     (2006.01)
    *B32B 3/12*     (2006.01)
    *B32B 3/26*     (2006.01)
(52) U.S. Cl.
    CPC ............... *B32B 3/12* (2013.01); *B32B 3/263* (2013.01); *B32B 3/266* (2013.01); *B32B 5/145* (2013.01); *B32B 7/02* (2013.01); *B32B 25/042* (2013.01); *B32B 25/08* (2013.01); *B32B 27/08* (2013.01); *B32B 2307/30* (2013.01); *B32B 2307/724* (2013.01)

(56) References Cited

U.S. PATENT DOCUMENTS

| | | | |
|---|---|---|---|
| 6,760,937 B1* | 7/2004 | Ou | A47C 7/021 5/641 |
| 8,434,748 B1* | 5/2013 | Pearce | B68G 5/00 267/142 |
| 8,932,692 B2* | 1/2015 | Pearce | A47C 27/056 156/242 |
| 2003/0096899 A1* | 5/2003 | Pearce | A43B 13/04 524/474 |
| 2007/0209120 A1* | 9/2007 | Clark | A47C 27/15 5/729 |
| 2008/0016622 A1* | 1/2008 | Prust | A47C 7/021 5/653 |
| 2012/0005821 A1 | 1/2012 | Fowkes | |
| 2018/0009977 A1* | 1/2018 | Kim | C08L 53/02 |

FOREIGN PATENT DOCUMENTS

| | | |
|---|---|---|
| JP | 2004-81546 A | 3/2004 |
| JP | 2005-143552 A | 6/2005 |
| JP | 3121554 U | 5/2006 |
| JP | 3140168 | 2/2008 |
| KR | 10-2005-0045819 A | 5/2005 |
| KR | 10-0945641 B1 | 3/2010 |
| WO | WO 95/00052 | 1/1995 |

OTHER PUBLICATIONS

European Search Report dated May 23, 2018 in counterpart European Application No. 15864796.6. (6 pages in English).

* cited by examiner

HONEYCOMB-STRUCTURED SITTING CUSHION

CROSS-REFERENCE TO RELATED APPLICATIONS

This application is a U.S. National Stage Application of International Application No. PCT/KR2015/007875, filed Jul. 28, 2015, which claims the benefit under 35 U.S.C. 119(a) and 365(b) of Korean Patent Application No. 10-2014-0174283, filed Dec. 5, 2014, in the Korean Intellectual Property Office.

TECHNICAL FIELD

The present invention relates to a honeycomb-structured seat cushion, and more particularly, to a honeycomb-structured seat cushion capable of providing sense of stability and comfort during sitting while having an enhanced thermal stability.

BACKGROUND ART

In general, a cushion is designed to be placed on a floor or a chair and seated by a user, and mostly refers to a cotton cushion stuffed with cotton.

The cotton cushion provides a seat feeling of softness to a user seated thereon by absorbing an impact. The seat feeling is provided because fibers in the cotton cushion are formed in a net-like structure and air continuously supplied provides a restoring force. However, in order to improve the seat feeling, a sufficient amount of cotton is required as much as the seat feeling is ensured. In addition, a long period of use of the cotton cushion leads to decrease in the thickness of the cushion, so that the seat feeling and breathability are degraded.

This type of a cotton cushion does not have an anti-slip function. Accordingly, when there is a motion of a user seated on the cushion, the cushion is slipped according to the motion of the user without being in place.

In order to reduce the limitation of the cotton cushion, a gel-type cushion has recently been suggested which is formed of material having an elasticity and a friction force, such as rubber, polyethylene, and the like, so that a cushion feel is provided and a slippage is reduced.

However, the conventional gel-type cushion, which is generally formed of hard rubber material, cannot provide a comfortable seat feeling to a user seated thereon, and has a heavy weight as compared to a cotton cushion.

DISCLOSURE

Technical Problem

The present invention has been made to solve the above-described problems, and the present invention provides a honeycomb-structured seat cushion, in which air is smoothly moved in the cushion by a ventilation structure having a superior breathability so that moisture and perspiration are effectively emitted and thus a thermal stability is achieved, and the body pressure is equally distributed to mitigate a strain applied to a particular body portion so that the seat feeling is improved.

Technical Solution

One aspect of the present invention provides a honeycomb-structured seat cushion formed of a ductile resin or ductile rubber material having a gel-like fluidity and an elasticity, the honeycomb-structured seat cushion including: a lower sheet which includes a first through-hole having a regular hexagonal cross-section and perforated in an upper side and lower side direction, the first through-hole repeatedly formed in an x-axis direction and a y-axis direction while being spaced apart from each other at a predetermined interval by a first partition; and an upper sheet which is formed on the lower sheet and includes a second through-hole having a regular hexagonal cross-section larger than the regular hexagonal cross-section of the first through-hole and perforated in the upper side and lower side direction, the second through-hole repeatedly formed in the x-axis direction and the y-axis direction while being spaced apart from each other at a predetermined interval by a second partition having a thickness (T2) smaller than a thickness (T1) of the first partition, wherein centers of the first through-hole and the first partition are aligned with centers of the second through-hole and the second partition, respectively.

Each of the lower sheet and the upper sheet may have a square shape, and a sidewall may be formed at sides of the lower sheet and the upper sheet.

The upper sheet and/or the lower sheet may gradually decrease in thickness at an end portion of one side thereof to form an inclined surface inclined downward in a form of a straight line or curved line.

In the lower sheet and/or the upper sheet, a reinforcing rib having an end thereof connected to the first partition and/or the second partition may be formed at the first through-hole and/or the second through-hole.

Advantageous Effects

As should be apparent from the above, according to the present invention, air is smoothly moved in the cushion by a ventilation structure having a superior breathability so that moisture and perspiration are effectively emitted and thus a thermal stability can be achieved, and the body pressure is equally distributed to mitigate a strain applied to a particular body portion so that the seat feeling can be improved.

In addition, a local stress applied to a thigh of a user being seated is reduced by representing a body structure of a region of the thigh so that an uncomfortable feeling can be minimized, and an additional rib is formed so that a structural stability can be enhanced and the defective rate in an injection process can be minimized.

MODES OF THE INVENTION

A honeycomb-structured seat cushion according to the present invention provides sense of stability and comfort during sitting, and ensures an enhanced thermal stability. An exemplary embodiment of the present invention is illustrated in FIGS. 1 to 4.

Figure 1:
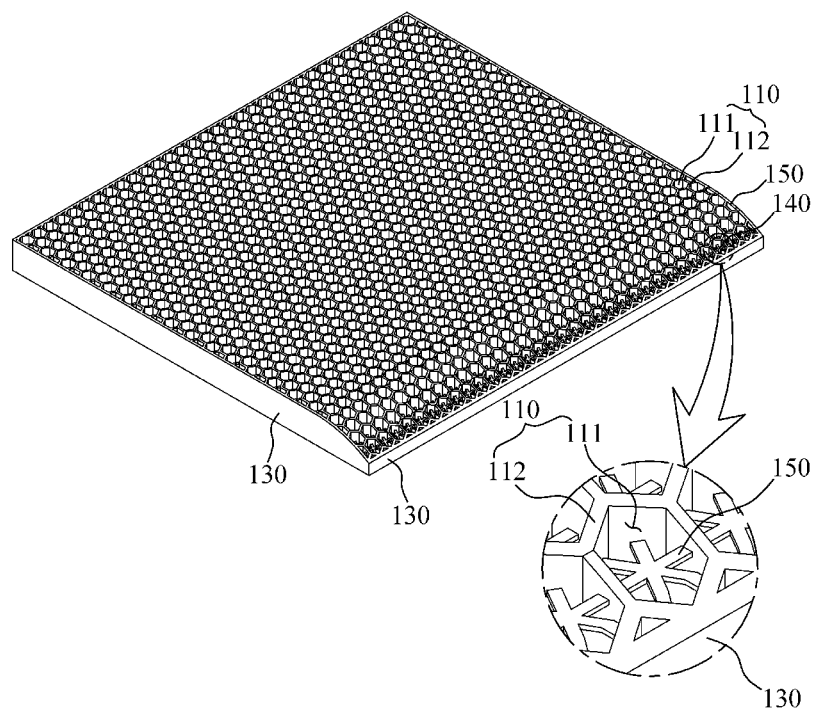
FIG. 1 is a perspective view illustrating a honeycomb-structured seat cushion according to an exemplary embodiment of the present invention.
Figure 2:
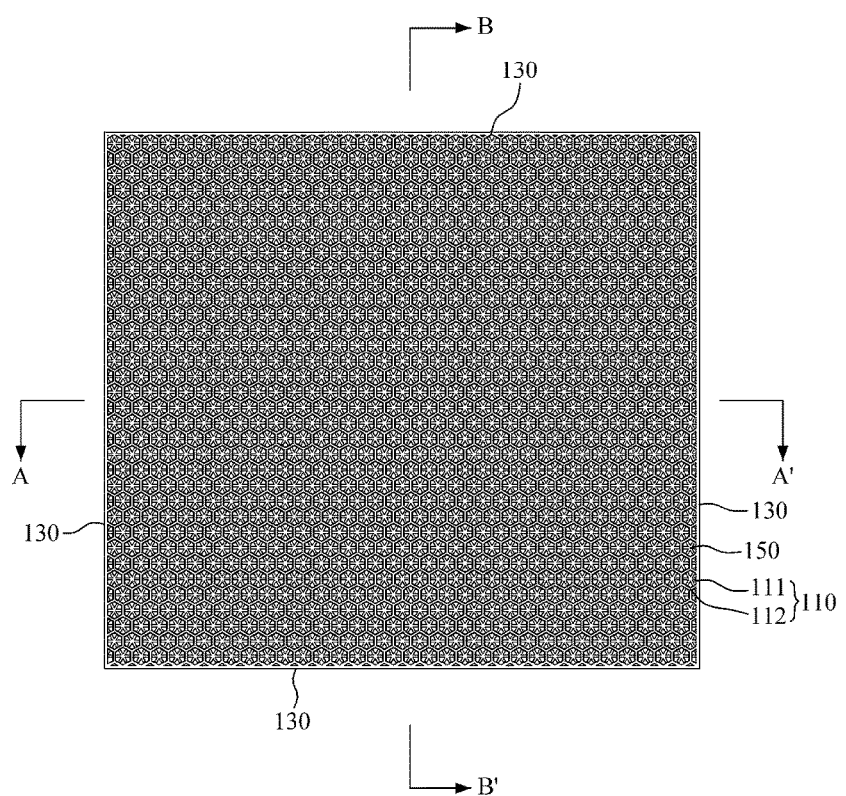
FIG. 2 is a plan view illustrating a honeycomb-structured seat cushion according to an exemplary embodiment of the present invention.
Figure 3:
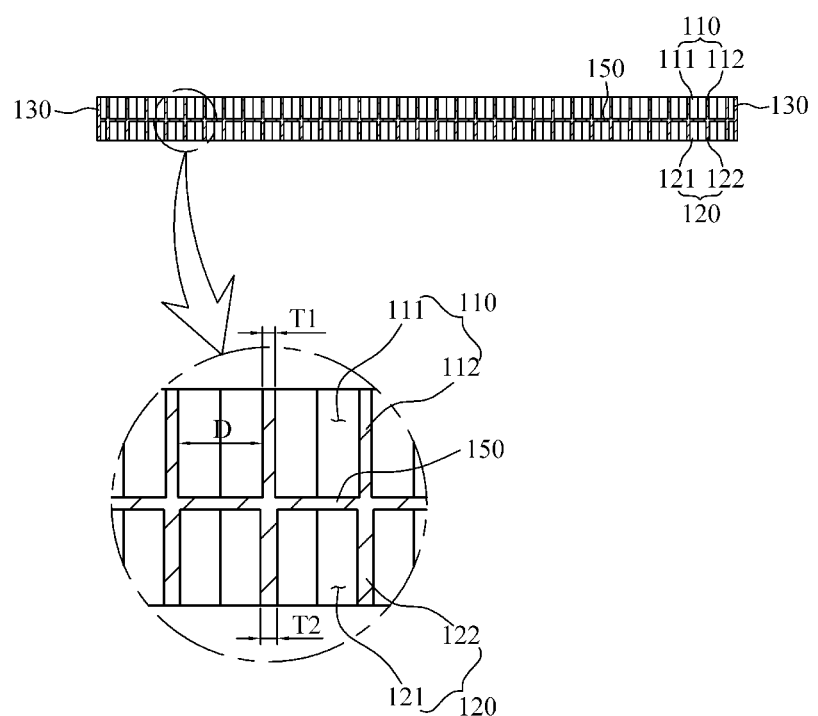
FIG. 3 is a cross-sectional view taken along line A-A' of FIG. 2.
Figure 4:
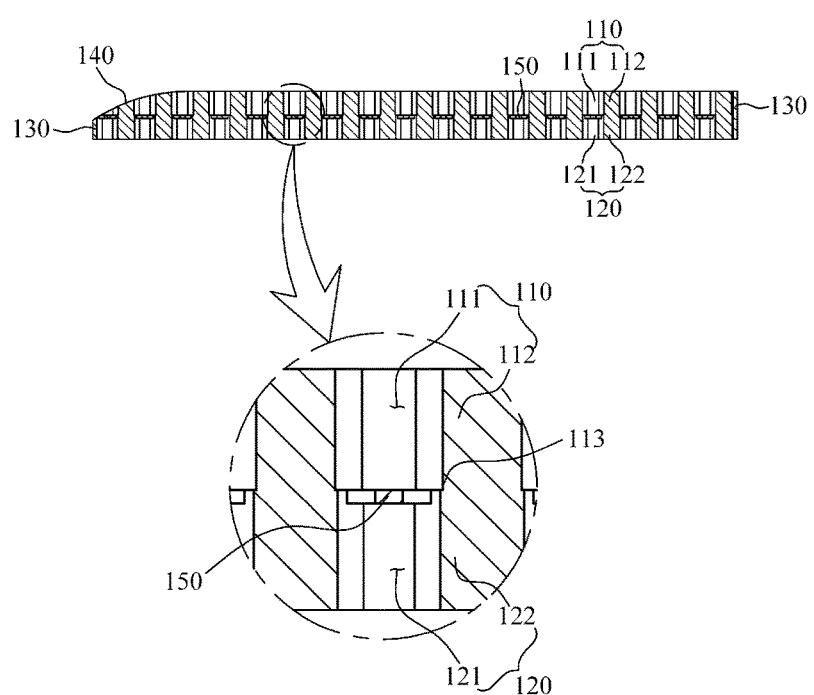
FIG. 4 is a cross-sectional view taken along line B-B' of FIG. 2.

FIG. 1 is a perspective view illustrating a honeycomb-structured seat cushion according to an exemplary embodiment of the present invention, FIG. 2 is a plan view illustrating a honeycomb-structured seat cushion according to an exemplary embodiment of the present invention, FIG. 3 is a cross-sectional view taken along line A-A' of FIG. 2, and FIG. 4 is a cross-sectional view taken along line B-B' of FIG. 2.

A honeycomb-structured seat cushion according to an exemplary embodiment of the present invention is formed of a ductile resin or ductile rubber material having a gel-like fluidity and an elasticity to provide a cushion feel, and includes: a lower sheet 120 which includes a first through-hole 121 having a regular hexagonal cross-section and perforated in an upper side and lower side direction, the first through-hole 121 repeatedly formed in an x-axis direction and a y-axis direction while being spaced apart from each other at a predetermined interval by a first partition 122; and an upper sheet 110 which is formed on the lower sheet 120 and includes a second through-hole 111 having a regular hexagonal cross-section larger than the regular hexagonal cross-section of the first through-hole 121 and perforated in the upper side and lower side direction, the second through-hole 111 repeatedly formed in the x-axis direction and the y-axis direction while being spaced apart from each other at a predetermined interval by a second partition 121 having a thickness T2 smaller than a thickness T1 of the first partition 122.

In this case, centers of the first through-hole 121 and the first partition 122 are aligned with centers of the second through-hole 111 and the second partition 121, respectively.

As described above, the lower sheet 120 and the upper sheet 110 are integrally bonded to each other, and take a structure of a honeycomb in which a plurality of regular hexagonal through-holes 121 and 111 are arranged in a thickness direction thereof, wherein the second through-hole 111 of the upper sheet 110 is larger than the first through-hole 121 of the lower sheet 120, so that the first partition 122 of the lower sheet 120 is larger than the second partition 121 of the upper sheet 110. As shown in the cross-sections of the lower sheet 120 and the upper sheet 110, a step 113 is formed due to a difference in thickness between the first partition 122 and the second partition 121.

Without a difference in thickness between the first partition 122 and the second partition 121, a buckling may occur so that the partitions may be excessively deflected and come into contact with each other, ending up degrading a distribution of a seat pressure. However, when the first partition 122 is formed to have a thickness greater than that of the second partition 121 as in the present invention, the first partition 122 making contact with a vehicle sheet and the like ends up having a relatively great thickness, thereby having a minimized deformation and providing a stably support, and the second partition 121 making contact with a hip and thigh of a user seated on the cushion is formed to have a relatively small thickness, thereby providing a seat feeling of softness.

The advantageous effects of the present invention, as stated in Table 1 below, are proved from a result of comparing the maximum pressure, the number of effective cells, and the average pressure between an exemplary embodiment in which the first partition 122 has a thickness T1 of 2.0 mm, the second partition 121 has a thickness T2 of 1.5 mm, and a length D of one side of the second through-hole 111 is 6.7 mm and comparative examples in which the thicknesses T1 and T2 of the first and second partitions 122 and 121 are differently set. The result is seen in Table 2.

TABLE 1

| Classification | T1 (mm) | T2 (mm) | D (mm) | Volume (cc) | Weight (g) | Ratio (%) |
|---|---|---|---|---|---|---|
| Exemplary embodiment | 2.0 | 1.5 | 6.7 | 410 | 357 | — |
| First comparative example | 1.75 | 1.75 | 6.7 | 401 | 349 | −2.2 |
| Second comparative example | 2.2 | 1.7 | 6.7 | 452 | 393 | 10.2 |
| Third comparative example | 1.8 | 1.3 | 6.7 | 367 | 319 | −10.5 |

For reference, according a method of analyzing the maximum pressure, the number of effective cells, and the average pressure in the above described exemplary embodiment and various comparative examples, which are written in Table 2, a pressure value for each sensor cell is obtained by using reaction force acting on a contact surface of an indenter by constructing an additional program. In this case, the pressure is calculated by dividing all reaction forces of nodes present in each sensor cell by a cell area. The sensor cell has a size of 15 mm×15 mm. Since a pressure distribution may vary depending on an alignment between a cell and a product, the pressure is calculated even with a shift of 7.5 mm in a traverse direction and a longitudinal direction, and the maximum contact pressure is obtained based on the average value of the pressures. A first order Mooney-Rivlin Hyperelastic material model is applied to the analysis.

TABLE 2

| Classification | Maximum pressure | | Number of effective cells | | Average pressure | |
|---|---|---|---|---|---|---|
| | Value (kPa) | Ratio (%) | Value (kPa) | Ratio (%) | Value (kPa) | Ratio (%) |
| Exemplary embodiment | 8.56 | — | 108.25 | — | 1.90 | — |
| First comparative example | 9.04 | 5.61 | 100.25 | −7.36 | 2.07 | 8.95 |
| Second comparative example | 9.39 | 9.70 | 103.75 | −4.16 | 2.01 | 5.79 |
| Third comparative example | 7.73 | −9.70 | 118.25 | 9.24 | 1.77 | −6.84 |

Referring to Table 2, when compared to the first comparative example in which thicknesses T1 and T2 of the first partition 122 and the second partition 121 are the same as each other, the exemplary embodiment and the third comparative example, in which thicknesses T1 of the first partition 122 is greater than thicknesses T2 of the second partition 121, have a lower maximum pressure and a larger number of effective cells.

The third comparative example has the lowest maximum pressure and the largest number of effective cells, but the thickness of the second partition 121 is excessively small, which is 1.3 mm, so that the third comparative example has a difficulty in mass production.

For reference, the lower sheet 120, the upper sheet 110, and a sidewall 130, which will be described below, may be formed of a ductile rubber material selected from the group consisting of butyl rubber, silicone rubber, acrylic rubber, hydrogenated Nitrile-butadiene rubber (NBR), epichlorohydrin rubber, chlorosulfonated polyethylene rubber, chlorinated polyethylene rubber, and butyl acrylate-ethyl acrylate-acrylonitrile: rubber; a jelly-like material, or a soft resin. In addition, the lower sheet 120, the upper sheet 110, and the sidewall 130 may be formed of a variety of known natural material or synthetic material.

According to another exemplary embodiment, each of the lower sheet 120 and the upper sheet 110 has a square shape, and the sidewall 130 is formed at sides of the lower sheet 120 and the upper sheet 110 exposed outside.

The sidewall 130 makes contact with end surfaces of the lower sheet 120 and the upper sheet 110. The sidewall 130 serves to connect the lower sheet 120 to the upper sheet 110 to increase a bonding force of the lower sheet 120 and the upper sheet 110, and serves as a frame to increase the durability of the lower sheet 120 and the upper sheet 110. The lower sheet 120, the upper sheet 110, the sidewall 130, and a reinforcing rib 150, which will be described below, may be separately formed and then coupled, or may be integrally produced in a single process, such as an injection molding.

According to another exemplary embodiment of the present invention, the upper sheet 110 and/or the lower sheet 120 gradually decrease(s) in thickness at an end portion of one side thereof to form an inclined surface 140 inclined downward in the form of a straight line or curved line.

The inclined surface 140 is arranged at a portion making contact with a thigh of a user seated on the cushion. The inclined surface 140, downwardly inclined as being directed forward of the cushion, removes a rectangular edge that causes the thigh portion of the seated user to be pressed, so that a local strain applied to the thigh of the seated user is removed, and thus improving a feel of stability when seated.

When the inclined surface 140 is formed as such, the sidewall 130 may differ in thickness between a rear side provided in the hip portion of the seated user and a front side provided in the thigh portion of the seated user. In detail, the thickness of the sidewall 130 on the front side is smaller than that of the sidewall 130 on the rear side.

According to another exemplary embodiment of the present invention, the lower sheet 120 and/or the upper sheet 110 are(is) provided at the first through-hole 121 and/or the second through-hole 111 with the reinforcing rib 150 having an end thereof connected to the first partition 122 and/or the second partition 121.

The reinforcing rib 150 may be provided in various shapes including a straight shape or a cross shape. Each end portion of the reinforcing rib 150 is connected to the first partition 122 and/or the second partition 121. When the reinforcing rib 150 is formed as such, the first partition 122 and/or the second partition 121 may be supported in the horizontal direction due to an action of the reinforcing rib 150 formed in the horizontal direction, so that the durability of the cushion may be improved, and burrs may be removed in the injection molding and the defective rate due to the burrs may be reduced.

As described above, according to the present invention, air is smoothly moved in the cushion by a ventilation structure having a superior breathability so that moisture and perspiration are effectively emitted and thus a thermal stability can be achieved, and the body pressure is equally distributed to mitigate a strain applied to a particular body portion so that the seat feeling can be improved. In addition, a local stress applied to a thigh of a user being seated is reduced by representing a body structure of a region of the thigh portion so that an uncomfortable feeling can be minimized, and an additional rib is formed so that a structural stability can be enhanced and the defective rate in the injection process can be minimized.

Although an exemplary embodiment of the present invention has been described for illustrative purposes, those skilled in the art should appreciate that various modifications, changes and substitutions are possible, without departing from the scope and spirit of the invention.

Therefore, the scope of the invention is defined by the appended claims.

The invention claimed is:

1. A honeycomb-structured seat cushion formed of a ductile resin or a ductile rubber, the seat cushion comprising:
   a lower sheet comprising a first through-hole having a regular hexagonal cross-section, and perforated in an upper side and lower side direction, wherein the first through-hole is repeatedly formed in an x-axis direction and a y-axis direction and spaced apart by a first partition; and
   an upper sheet formed on the lower sheet, comprising a second through-hole having a regular hexagonal cross-section larger than the regular hexagonal cross-section of the first through-hole, and perforated in the upper side and lower side direction, wherein the second through-hole is repeatedly formed in the x-axis direction and the y-axis direction and spaced apart by a second partition having a thickness less than a thickness of the first partition; and
   a reinforcing rib spanning across an interior of either one or both of the first partition and the second partition, and disposed inside either one or both of the first through-hole and the second through-hole,
   wherein centers of the first through-hole and the first partition are aligned with centers of the second through-hole and the second partition, respectively.

2. The honeycomb-structured seat cushion of claim 1, wherein
   each of the lower sheet and the upper sheet comprises a square shape, and
   a sidewall is formed at sides of the lower sheet and the upper sheet.

3. The honeycomb-structured seat cushion of claim 1, wherein either one or both of the upper sheet and the lower sheet decreases in thickness at an end portion to form an inclined surface.

4. A seat cushion, comprising:
   a cushion element comprising a first surface and a second surface;
   hexagonal holes passing through the first surface and the second surface; and
   ribs formed within the hexagonal holes,
   wherein the hexagonal holes are each of a same geometry, form a tessellating pattern with each other, are spaced apart from each other by a same distance, and each comprise a first portion extending through the first surface and into the cushion element, and a second portion steppedly extending from the first portion and through the second surface,
   wherein a width of the first portion is greater than a width of the second portion, and
   wherein the ribs are formed at a location at which the second portion steppedly extends from the first portion.

* * * * *